United States Patent [19]

Trussell et al.

[11] Patent Number: 4,539,655
[45] Date of Patent: Sep. 3, 1985

[54] MICROCOMPUTER BASED DISTRIBUTED CONTROL NETWORK

[75] Inventors: Gerald C. Trussell, Laveen; Andre B. Felix, Tempe; Thomas D. Hembree; Paul F. Rollins, both of Phoenix, all of Ariz.

[73] Assignee: Phoenix Digital Corporation, Phoenix, Ariz.

[21] Appl. No.: 358,718

[22] Filed: Mar. 16, 1982

[51] Int. Cl.³ ............................................. H04J 3/08
[52] U.S. Cl. .............................. 364/900; 340/825.01; 370/87
[58] Field of Search .................. 350/96.2; 370/55, 16, 370/35, 45, 53, 54, 87, 88, 89, 86; 364/200, 900; 455/8, 11; 340/825, 825.01

[56] References Cited

U.S. PATENT DOCUMENTS

| | | | |
|---|---|---|---|
| 3,681,694 | 8/1972 | Sarati | 371/8 |
| 3,882,456 | 5/1975 | Takada | 455/8 |
| 4,009,469 | 2/1977 | Boudreau et al. | 370/16 |
| 4,144,410 | 3/1979 | Flickinger et al. | 370/88 |
| 4,190,821 | 2/1980 | Woodward | 370/16 |
| 4,380,046 | 4/1983 | Fung | 364/200 |

OTHER PUBLICATIONS

Penney et al., "Survey of Computer Communication Loop Networks", Aug. 4, 1979, pp. 165-180.

Primary Examiner—Gareth D. Shaw
Assistant Examiner—Tim A. Wiens
Attorney, Agent, or Firm—Gregory J. Nelson

[57] ABSTRACT

A distributed automated control network system consisting of a master host computer, network processing nodes for monitoring and control of work locations and a subhost node which interfaces the nodes and host computer. The subhost includes dual microprocessor configurations on a common bus, one for communications and one for control, operating 180° out of phase. Each node can be configured from a variety of modular subsystems on a common bus including modules for network control, data acquisition, digital and analog inputs and outputs, display terminals and the like in accordance with system requirements. The nodes communicate via two fiber optic channels, one operating clockwise and the other counterclockwise with foldback capability in the event of a fault. A conventional signal back-up is also provided.

18 Claims, 11 Drawing Figures

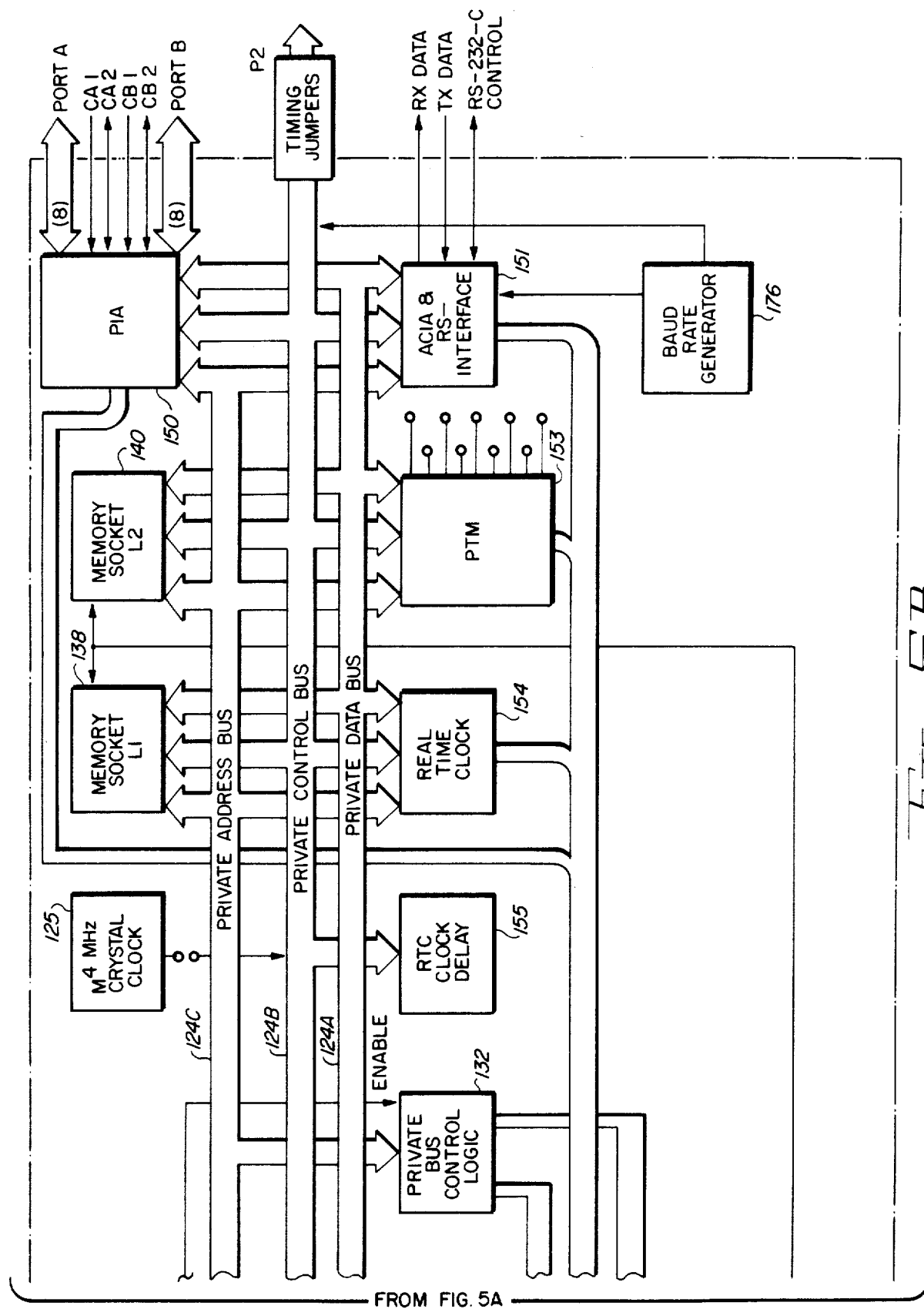

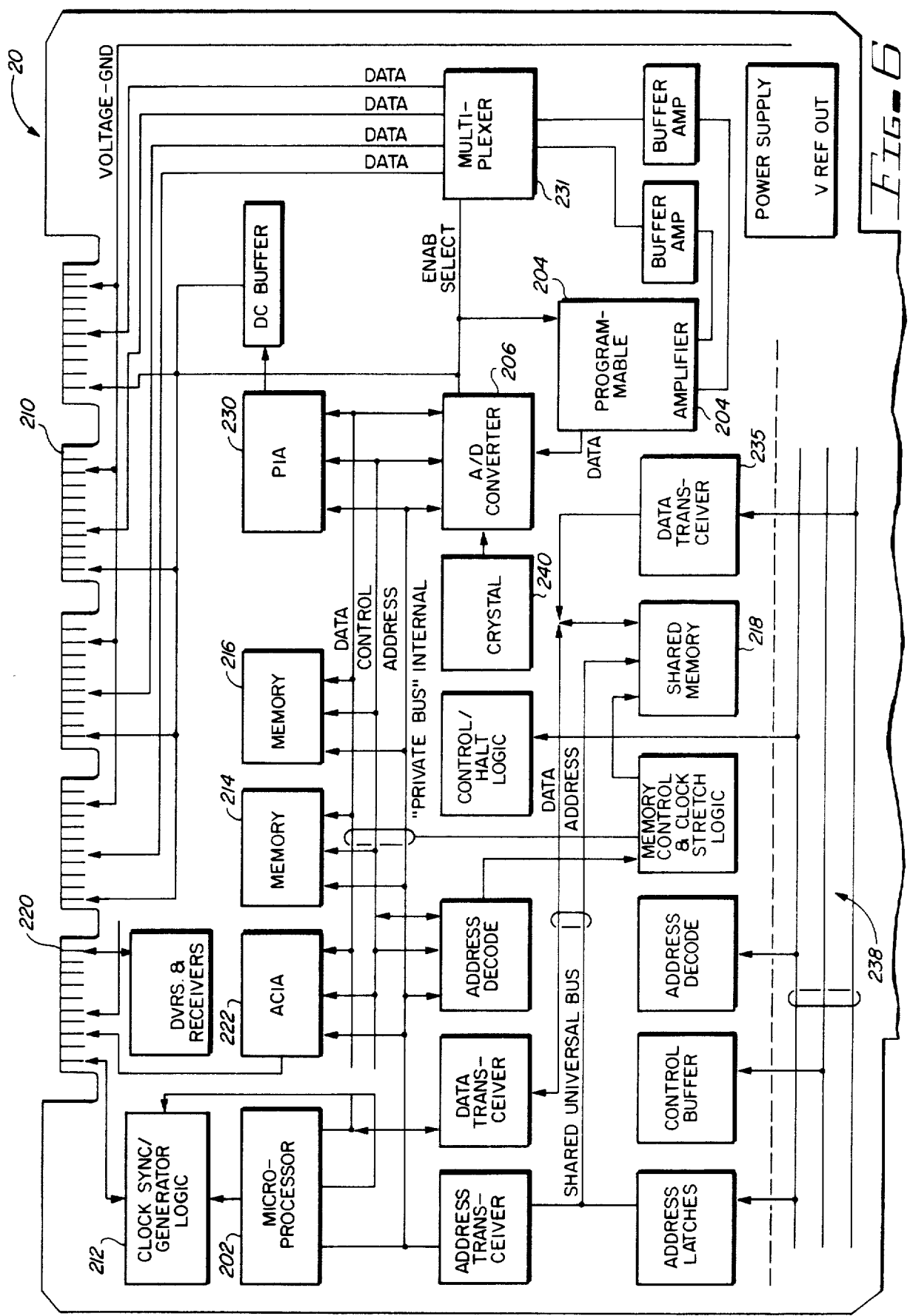

MICROCOMPUTER BASED DISTRIBUTED CONTROL NETWORK

The present invention relates to an automated monitoring and communication system and more particularly relates to a microcomputer based monitoring and communication system having multiple stations each with selected modular control and monitoring units and which utilizes a redundant fiber optic information management network.

Early automation and control systems for process control applications conventionally utilized large central computer to monitor and control plant operations. While these systems represented an advance in the art, such systems were generally slow, expensive and did not provide the user with adequate flexibility. Further, because the prior art systems utilized a single computer, reliability was a problem as no back-up systems existed.

Another approach was to install programmable computers at the various stations or at process locations within the plant. These systems are generally termed "distributed" systems. While the use of multiple, programmable controllers does increase productivity, the use of multiple separate computers does not provide a system which interconnects the programmable controllers to form a central facility data acquisition process control network tying the plant together in a controlled network.

Typical of the prior art distributed plant automation systems are the following. U.S. Pat. No. 4,306,213 to Baldwin discloses an optical transmission system which employs a plurality of receiver/transmitter pairs. One of the plurality of pairs is selected to propagate optical signals under control of a switch. The optical system as propagated is monitored and if a fault is detected in the signal, another redundant receiver/transmitter pair is automatically switched in. The patentee does not include any type of back-up system for this failed system.

A multiple access fiber optical bus system is dislcosed in U.S. Pat. No. 4,017,149. The patentee suggests that the degree of reliability at a multiple access fiber optical system can be varied depending on the number of independent mixer loops secured to a terminal. Passive optical coupler shown in U.S. Pat. No. 4,072,399 utilizes a plurality of wave guides with the same signal.

Microprocessor based communication systems which can interface with controllers are disclosed in the prior art. For example, U.S. Pat. No. 4,244,022 to Kendall shows local control of satellite irrigation systems and a central overriding control.

In an ideal distributed processing system, it is necessary for plural processing stations to communicate with each other as well as with peripheral equipment. Distributive processing systems do not rely on a large central processing station to control all the operation performed within the system. Rather, many of the stations within the system perform their own processing when the processing requirements exceed the capability of any one station another system assists.

The present invention provides a microcomputer based monitoring and communication system or network designed to interface with the state-of-the-art programmable controllers, supplying a link for multistation process control. The present system provides the advantages mentioned above while overcoming the deficiencies of prior art systems. Management of information is transmitted over a redundant communications link using fiber optics with simultaneous transmission and reception backed up by conventional signal system.

Briefly, the basic system of the present invention includes three-level or tiertiary system consisting of a subhost microcomputer at the secondary level. The subhost microcomputer operate in pairs connected over a common bus and function as gateways to service the communication loops of the third level to individual stations or nodes. The subhost computer communicates with the host computer. The primary or host computer is a large minicomputer main frame containing mass storage devices. The subhost also communicates with various stations or nodes which are at the third level. The host computer can be considered as the central command computer, usually a maxi/mini computer with bulk storage. The subhost computer and nodes include the basic system module with selected system components for monitoring and control as required. The system modularity allows the user to configure the system in accordance with the requirements.

Network and stand-alone communications and background processing are handled by node network controller modules with an on-board microprocessor. Other units in the network or system which may be located at the nodes include a process command unit, which is a single card computer with a general purpose microcomputer designed to work in stand-alone monitoring control applications. The process command unit provides foreground processing and includes a calendar clock with alarm for keeping track of critical real time dependent process variables. Other principal modular components include a CRT module which may be available with color graphics for full color display of facility status. An analog subsystem is also available which is a high-resolution analog-to-digital converter with its own processor and memory. A digital I/O subsystem module communicates with switches, motor controls and relays to activate peripheral equipment. A communications interface logic module may also be incorporated which is a single card interface between the communications network and the network control module and interfaces two fiber optics channel and one hard-wired signal channel.

Each node and the subhost interconnect over two fiber optic loops or channels with a conventional back-up signal system such as an RS 422 twisted pair. One channel transmits in one direction through the system loop and the other channel transmits in the reverse direction. Should the network fail, the system will locate and identify the break and transmit around the break by-passing the problem and maintaining the system in operation without loss of data.

Thus, it will be seen that the present invention provides a modular microprocessor based control system with high reliability and high speed communication through a redundant fiber optics network or highway. The network of the present invention will be more fully understood from the following drawings in which:

FIG. 6 illustrates the analog input module;

Figure 1:
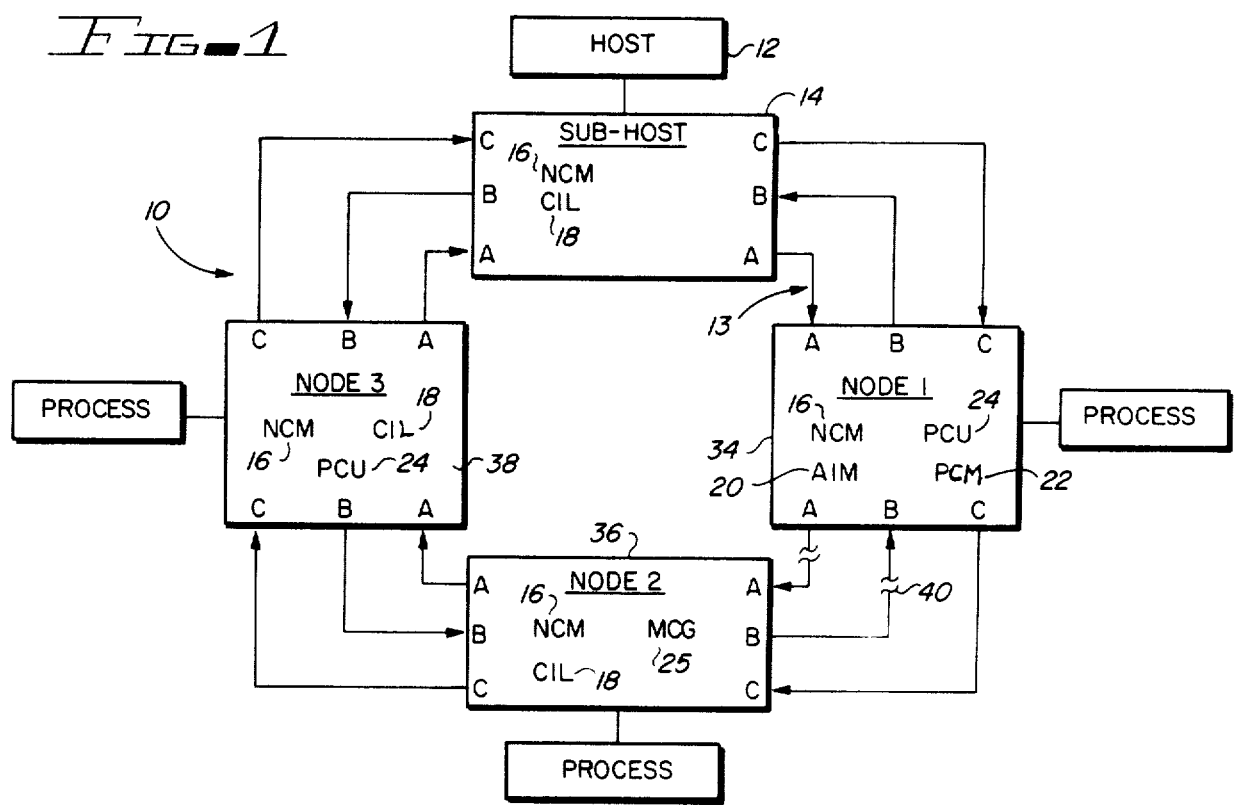
FIG. 1 is a schematic of a typical network configuration.

Referring now to the drawings, particularly FIG. 1, the microcomputer based distributor control network of the present invention is generally designated by the numeral 10 and is shown schematically. Referring to FIG. 1, the basic system 10 includes master host computer 12 which is a large main frame microcomputer containing mass or bulk storage devices. A typical host computer would be an IBM Series I. The subhost 14 provides the gateway between the host and the network loop 13 or several network loops. The subhost station 14 is comprised of various system compound modules including at least two network control modules (NCM) 16 interconnected to communicate with one another over a common bus, two communication interface logic modules (CIL) 18, and the necessary fiber optics or coaxial drivers. The abbreviations NCM and CIL will be used throughout to refer to the network control module and the communications interface logic module, respectively. These and other abbreviations are utilized in the interest of brevity and convenience.

A brief functional overview of the subhost's operation follows and will aid in an understanding of the invention. More detailed discussion of the components and their interrelationship is set forth hereafter in the specification.

The subhost node or station 14 provides a gateway between the host computer 12 and the network(s) 13. Each NCM, as will be described in greater detail hereafter, includes a 8/16 bit microprocessor offering a high speed multi-protocol device, programmable timer, DMA capability, and selectable memory devices.

The two NCM's communicate over a common bus. In the operation of subhost node 14, one CIL 18, after receiving and processing its input, couples to the multi-protocol device of the adjoining module 16. Through a DMA operation, the data is coupled to memory. The second NCM, through a DMA operation, transfers data from memory to its multi-protocol device. The data is coded by the second CIL and transmitted completing the gateway operation.

Figure 2:
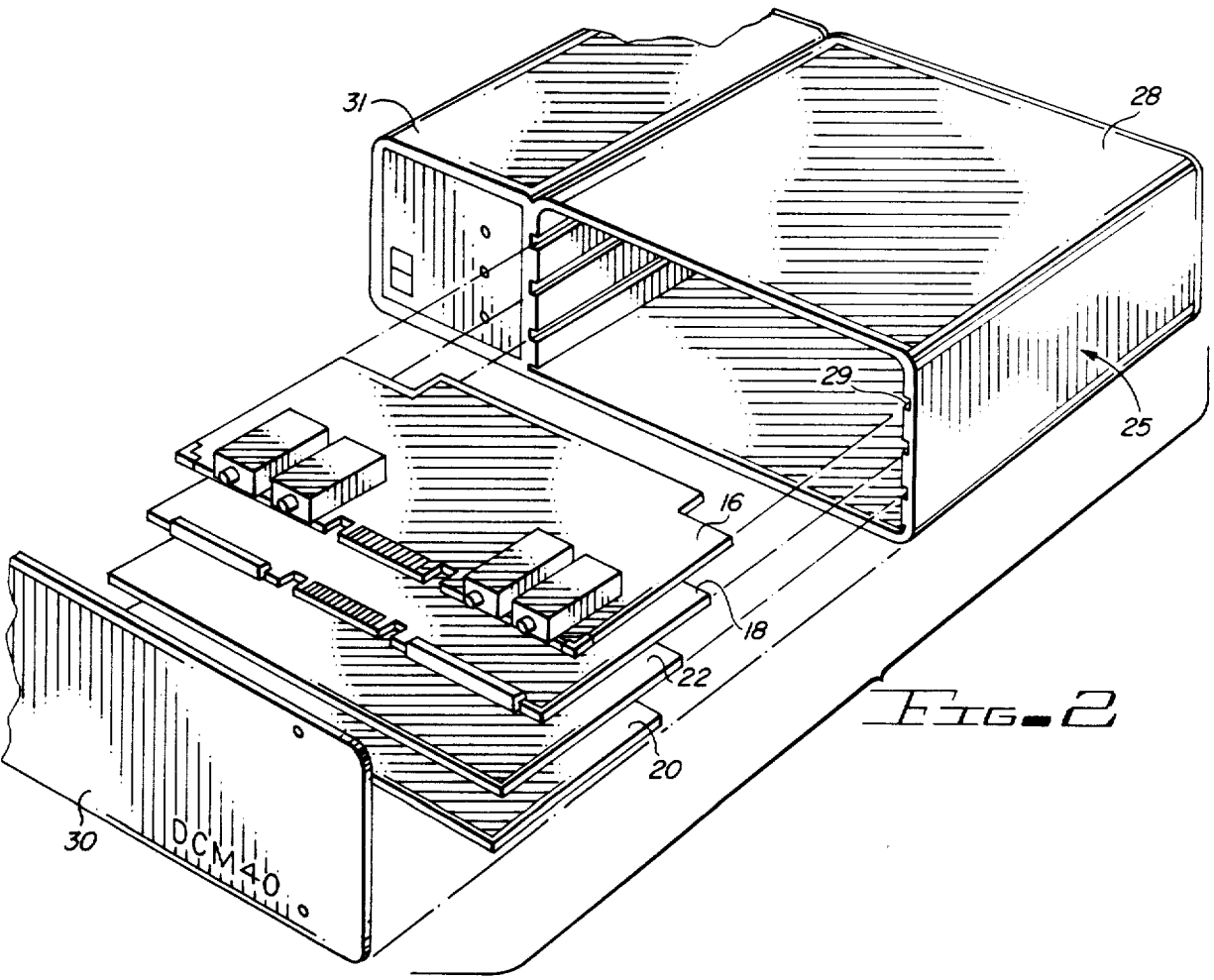
FIG. 2 is a schematic of a module enclosure.

The NCM modules and other modules of the system are all compatible with chassis 25 as seen in FIG. 2 having enclosure 28 defining expandable racks 29 to accept the modules. Status LED's, cable interconnects for conventional and the fiber optics communication systems are provided in front panel 30. Power supply section 31 is connectable to 90-250 VAC.

The third level of the tiertiary heirarchal network consists of stations or nodes 34, 36 and 38. The various nodes will be placed, for example, at the control panels of existing machines on the plant floor. The system can be expanded by installing additional nodes in the network loop 13 or creating additional processing loops in the network if necessary. Each of the loops has at least one subhost 14 and a series of processing nodes. Each of the various nodes include an NCM 16 as generally described above and as will be more fully described in detail hereafter. In addition, each of the nodes includes the basic enclosure 28 containing the various modular components as required by the process thus giving the node a distinct personality. Typical work station applications might include control over robotics, test monitoring, monitoring of laser measurements, monitoring mold machine parameters, welding monitoring, fire and security systems and the like. Each node is expandable to include the various components mentioned above. By using separate communication and data acquisition and control microcomputers, critical machines or processes can be controlled without being interrupted by communication function. Each module uses a common bus giving flexibility. In low-density areas where there are few points only a node controller module and a data acquisition control module will be needed. In high density areas where more analytic log inputs are needed, the analog input and other components can be added.

Processing nodes 34, 36, 38 can be custom configured incorporating a variety of modules including the A to D systems (AIM) 20 digital I/O interface and control (DM) 22, colorgraphics (MCG) 25, a process command unit (PCU) 24 as well as the NCM, CIL and other systems available in the industry.

Each node 34, 36, 38 and the subhost 14 interconnect over two communication channels, channels A and B, with an RS 422 twisted pair of back-up interconnecting over channel C. As shown in FIG. 1, channel A transmits clockwise through the loop and channel B simultaneously in a counterclockwise direction. Since fiber optics allow economic transmission in only one direction, each node and subhost always transmit in both directions. Each node through its communications interface logic decodes its coded inputs, processes a signal and unless otherwise instructed recodes and transmits the data. Should the network fail to detect an input, it modifies the operation as follows. If channels A and B have been broken at point 40, node 36 on failing to detect an input shuts the input down, records the error. Nodes 36 and 38 switch to channel B for message reception. For data transmission, node 34 must switch over to channel B while node 36 and 38 will continue to transmit data over channel A. Should both channel A and B break in several points, the system transfers over to the RS 422 conventional signal back-up over channel C. The network control modules 16, as described hereafter handle background processing and communications.

Only one fiber optic channel A or B is needed for normal operation. The second fiber optic channel and the conventional signal over channel C serve as a redundant back-up. Data travels clockwise around the ring of channel A and counterclockwise on channel B. The subhost and the nodes transmit in both directions. As a practical matter, the distance limitation of optical fibers is about one kilometer between nodes. The signal is regenerated and reshaped at each node before it is relayed around the ring. This allows the total length of the ring or network to be substantially unlimited since the signal is resynchronized and repeated at every node.

In order to provide for of a power loss at one of the repeater nodes, power for communications is run with the communication line to each of the nodes. This permits power to fail at any node without affecting the entire communications ring.

The benefits of optical transmission is substantial, particularly in noisy factory environments. The fiber optics transmission channels or highway will transmit information at speeds in excess of one-million bits per second. Optical cables are immune to electrical noise such as RF and electromagnetic interference, static electricity, high and low temperature extremes, humidity and volatile gases. Further benefits of fiber optics are that they are explosion proof and do not present shock hazards.

Basically, the fiberoptics link consists of an optical source such as a light-emitting diode transmitter, lens assembly on the fiberoptics cable, the fiber cable and another lens assembly on the opposite end with an optical detector which changes the light impulses to electrical impulses. For example, the light source could include a device such as SPX-4689-003 sold by Spectronics and the light detector could include a silicon photo diode such as SPX-4691-2, also sold by Spectronics. The use and construction of fiberoptics links per se are known to those skilled in the art and further detailed discussion of this aspect of the invention is not deemed necessary.

The construction and theory of operation of various component modules which make up the system will be more specifically described:

I. Network Control Module (NCM)

As background, the NCM 16 can be used as stand-alone microcomputers or as communications controllers, can be interconnected with other modules via the high speed asychronous communications port forming a distributed processing network. The primary function of the NCM 16 in each node of a distributed processing system is to control the internode and node-subhost communications. The NCM modules offer a CPU, a multiprotocol high-speed synchronous communications port, an RS-232-C communications port, direct memory access capability, power-on restart circuitry, system clock and timing circuitry, provisions for mounting selected memory devices, programmable timers, multiple levels of interrupt, a read-set/write-clear lock bit register, bus drivers and receivers for system expansion. The NCM also has the capability of interfacing with another NCM 16 or a PCU-24 Single Card Computer on a common bus.

Figure 3A:
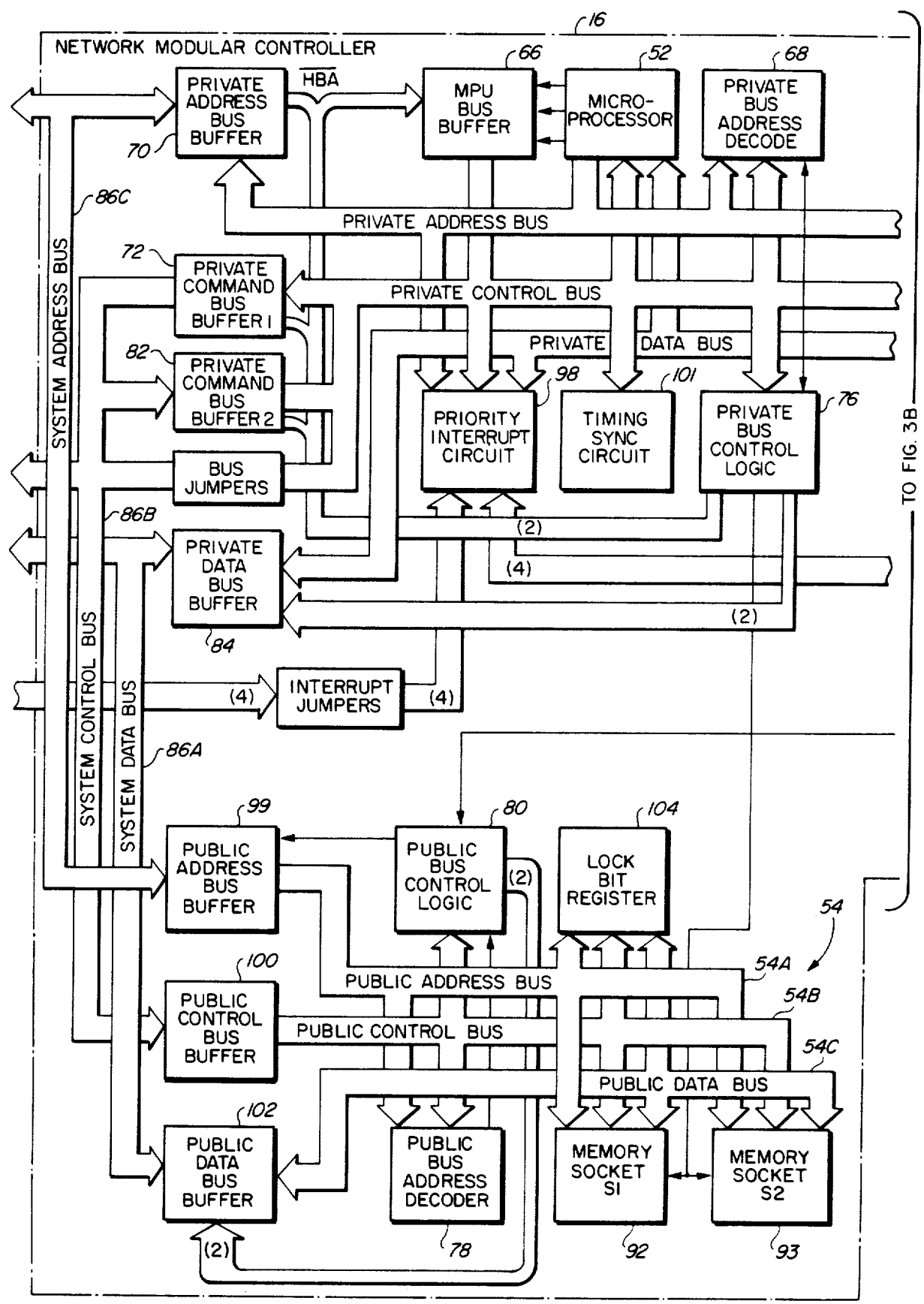
FIG. 3 is a block diagram of the network control module which is part of the system of the present invention.
Figure 3B:
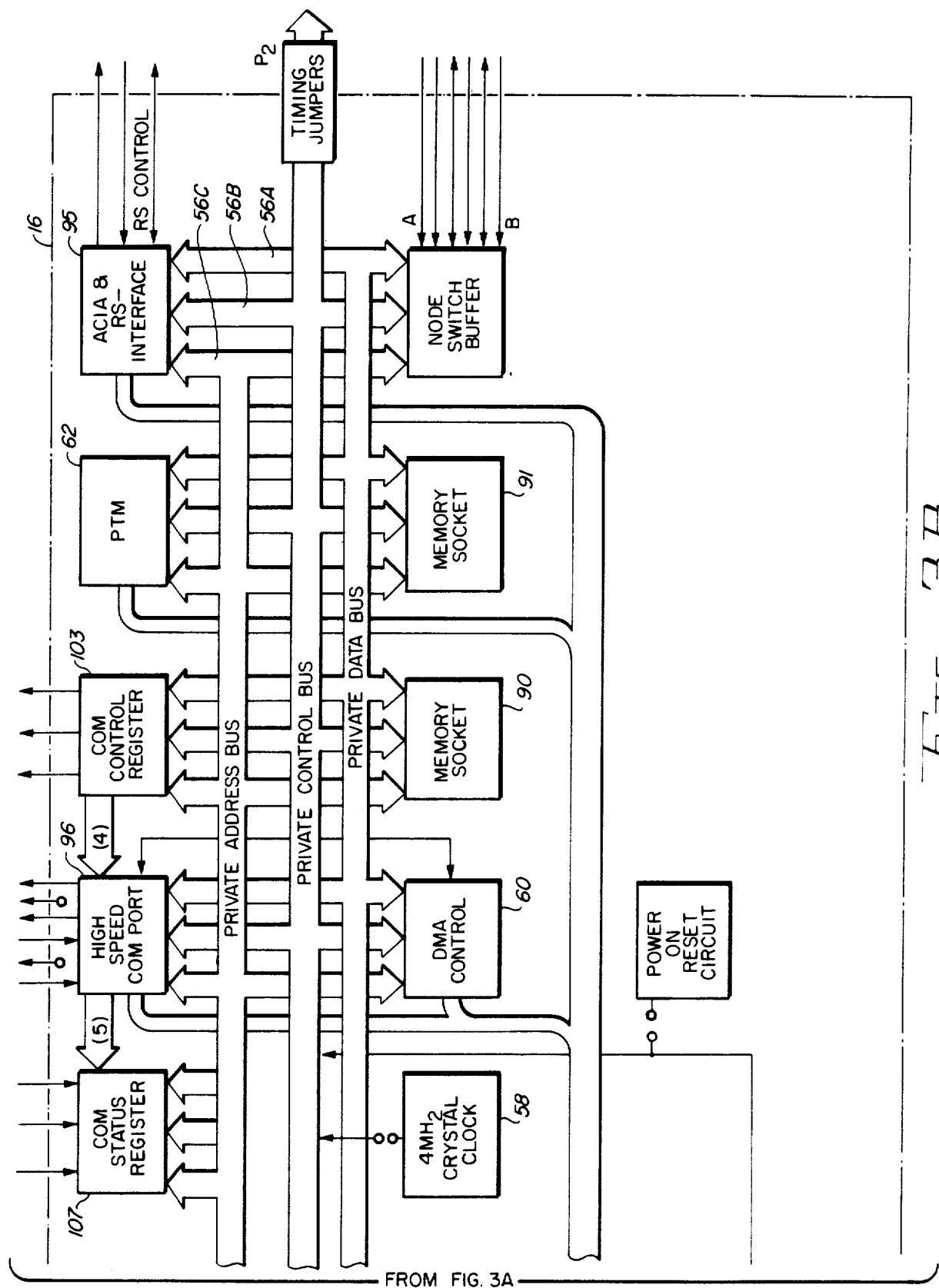

Referring to FIG. 3, the network control modules 16 is built around microprocessor 52, which may be for example a 6809, as sold by Phoenix Digital Corporation of Phoenix, Ariz., the microprocessor's internal clock characteristics, and the module's dual bus concept. NCM 16 provides instruction mnemonics in multiple addressing modes, internal registers and accumulators, vectored interrupts, and an external clock. With a 16-bit program counter, NCM 16 addresses 64K bytes of memory and addresses I/O as memory.

The NCM 16 have two onboard buses, private bus 56 and the public bus 54. Private bus 56 consist of data bus 56A, control bus 56B and address bus 56C. Public bus 54 consists of data bus 54C, control bus 54B and address bus 54A. The private bus is the private property of and all activity on this bus is controlled by onboard microprocessor 52. Processor 52 must be halted before an external device can gain access to the components on the private bus 56.

Public bus 54 is time-shared with the other microprocessors on the system bus. That is, in a dual microprocessor system, each microprocessor on the system bus can access any memory location on the public bus. This time-shared memory addressing concept, in addition to allowing all the system microporocessors to address common memory and I/O, permits the system microprocessors to communicate with each other and to share common resources.

NCM 16 may be used in single microprocessor systems or in multiple microprocessor applications. In a single processor application the NCM is the system timing master. In multiple microprocessor systems, however, either NCM can be used either as a timing master or slave.

In setting up a timing master NCM, a signal from the onboard clock 58 or an externally generated clock signal may be used. In most applications, module 16 uses the onboard generated clock signal; however, in certain cases, such as working with a CRT in a single microprocessor application, an external clock signal is used. In the CRT application, the external clock is used to synchronize the microprocessor's timing with the CRT refresh circuitry's refresh operation.

Figure 4:
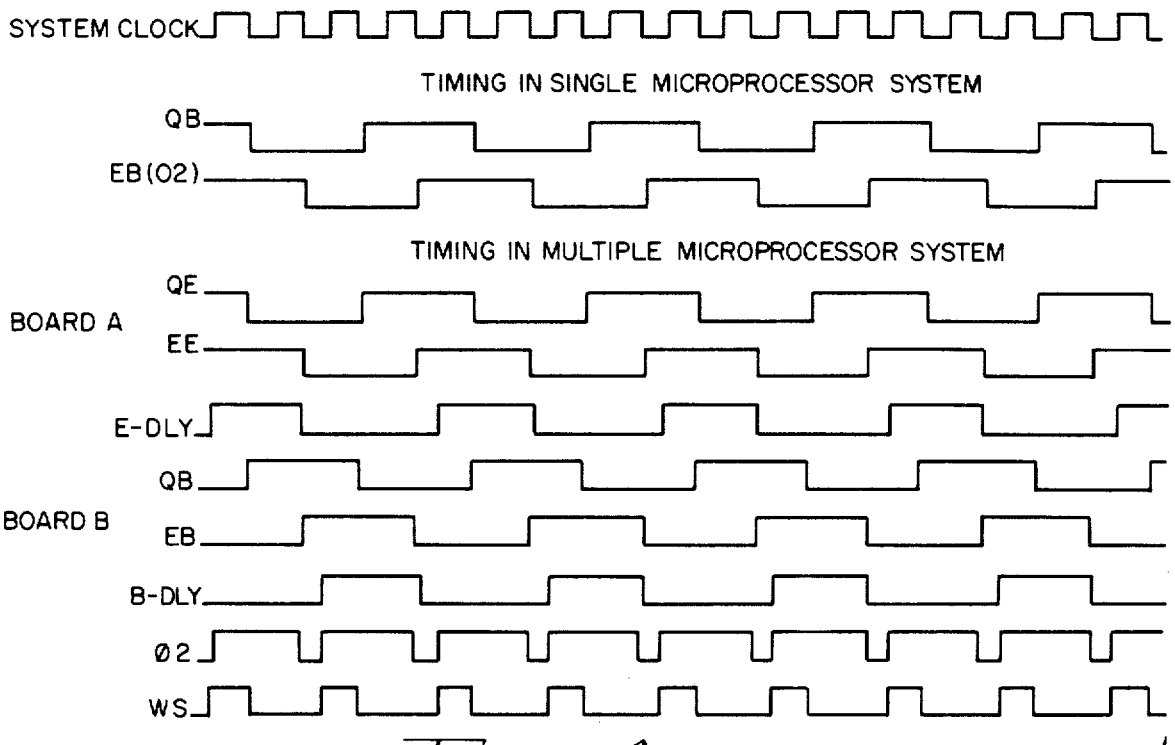
FIG. 4 illustrates the timing relationship in multiple and single multiprocessor applications.

In a multiple microprocessor system, the timing master and the timing slave modules coordinate their timing through connector P2. The timing master is responsible for the generation of the basic system timing signal whether it is internally or externally generated. These signals are coupled to the timing slave module, whose timing sync circuit synchronizes its timing with that of the timing master. FIG. 4 depicts the time relationships between the master timing module's clock signals and the slave timing module's clock signals.

The internal clock circuit in each of the microprocessors 52 breaks down the selected system clock signal and generates the devices two external timing signals E (Enable) and Q (Quadrature). The E timing signal, shown in FIG. 4 is the synchronization signal used as the system clock. This signal is used as the $\phi 2$ (Phase 2) clock signal when working with a microprocessor peripheral family. The Q timing signal, also shown in FIG. 4 indicates that the address and data on their respective bases are stable.

Microprocessor 52 also provides the module 16 with the capability to work with slow memory. When the microprocessor is accessing slow memory, this memory pulls the MEMRDY (MEMory ReaDY) line low until it completes it assigned function. This input now halts the microprocessor with its E timing signal remaining high. When the slow memory has completed its operation, it returns the MEMRDY line high freeing the microprocessor to resume its operation.

When the direct memory access (DMA) controller 60 or an external device requests control of the bus to perform a DMA operation, the requesting unit pulls the REQ (bus REQuest) line low. Microprocessor 52 now places a bus available and bus status signals in a high state. It also places its address bus outputs, data bus outputs, and read/write command in their high impedence states. At this time, the microprocessor stretches its internal clock signals halting its internal operation and continues generating its E and Q timing signals. The requesting unit now has access to the bus. At the completion of the DMA function, the requesting unit removes its REQ command and the microprocessor continues its operation.

In setting up the module, the user has the option of enabling the power-on reset circuit 61 via a jumper connection. When power is first applied and the jumper is installed, the power on reset circuit generates a RESET command. The module also may receive a RESET command from an external source when the RESET or RESET' line is pulled low and the corresponding bus jumper is installed.

The RESET command, while low, resets and initializes the programmable timer module (PTM) 62, the DMA controller 60 and the multiple protocol communications controller (MPCC). It also instructs the private bus control logic 76 to inhibit writing into any onboard memory devices 90, 91. When the RESET command returns to a high level, the microprocessor reads the vectored restart addresses FFFE and FFFF, loads their contents in its program counter, and starts executing the selected routine.

Microprocessor 52 in accessing memory, places a 16-bit address on the private address bus, a R/W command and a VUA/VMA (Valid User's Address/Valid Memory Address) command through the MPU bus buffer 66 onto the private control bus 56B and, in a memory write operation, eight bits of data on the data bus 56A. The private address bus 56C transfers the address to the private bus address decoder 68 and to the private address bus buffer 70 while the private control bus couples its control signals to the private bus control logic and private command bus buffer 72. These bus buffers place their respective inputs on the system bus. The public address bus buffer and public control bus buffer, in turn, couple the addresses and commands on their respective system bus inputs to the public bus control logic and public bus address decoder.

The private bus address decoder 68 now processes its input and determines whether the onboard microprocessor 52 is accessing a memory location on the private bus 56 or a memory location external to this bus. When the decoder 68 determines that the microprocessor 52 has selected a device on the private bus, it applies a select command to that device and an enable command to the private bus control logic 76. The control logic 76 now decodes its input commands and enables the transfer of data between the microprocessor and the selected memory location. The control logic 76 at this time also disables the private data bus buffer.

When the onboard microprocessor 52 is accessing memory external to the private bus 56, the private bus address decoder 68 informs the private bus address decoder 68 which, in turn, decodes the R/W command, the private bus control logic 76 enables the private data bus buffer 84 to transfer data between the system bus and the microprocessor.

The public bus address decoder 78 on determining that a system microprocessor is accessing its memory, couples a select command to the selected device and an enabling command to the public bus control logic 80. The control logic 80 now decodes the R/W command and enables the public data bus buffer 102 to transfer data between the selected memory location 92, 93 and the system bus 54.

For an external unit to gain access to the private bus 56 such as during maintenance, it must apply a HALT command to this module. This command halts the microprocessor, which, in turn, places a high level bus available (BA) command on the private command bus. The private bus control logic 76, on decoding the BA and HALT commands, disables private command bus buffer 72, and enables private command bus buffer 82 and the private address bus buffer 70 to couple the address and commands from the system bus to their respective private buses'. The address bus 70 now enables the private bus address decoder 68 and initiates the transfer data in the same manner as when the onboard microprocessor access this bus except now the private data bus buffer is enabled to transfer data between the selected private bus memory location and the system bus 85.

When the private address bus buffer 70 circuit receives a high level HBA (Halt and Bus Available) command, it transfers the microprocessor address outputs onto the system bus. On receiving a low level HBA command (the onboard microprocessor is halted); it transfers addresses from the system bus 85 onto the private address bus 56C.

Private address bus buffer 72, controls the transfer of commands from the private bus 56 to the system bus 85. On receiving a low-level HBA command, this buffer circuit is enabled to transfer commands from the private bus 56 to the system bus 85. When circuit 72 receives a high-level HBA, this buffer is disabled and places its outputs in their high impedance states.

Private command bus buffer 82, controls the transfer of commands from the system bus 85 to the private bus 56 while the onboard microprocessor 52 is halted. When the onboard microprocessor is operating, this bus buffer receives a high-level HBA input and places its outputs in their high impedance states. When the microprocessor is halted, this buffer receives a low-level HBA input transfers commands from the system bus to the private bus.

The private data bus buffer 84 controls the transfer of data between the onboard microprocessor 52 and the system bus 85. The private bus control logic 76, through its decoding of the private bus address decoder ENABLE and R/W commands, controls the operation of this bus buffer.

The private bus address decoder 68, consisting of an address decoding PROM and control logic, decodes its input and determines whether the microprocessor is accessing a device on the private bus or external to this bus and then generates the appropriate enabling pulses.

The private bus control logic 76, through the decoding of its input commands, controls the flow of addresses, data, and control commands between the private bus 56 and the system bus 85.

Module 16 has two memory devices 90, 91 on the private bus and two 92, 93 on the public bus. The private bus can only be accessed by the onboard microprocessor while the public bus can be accessed by all microprocessors in the system. The four memory sockets are capable of mounting RAM's or ROM/PROM devices in accordance with the user's requirements.

PTM 62 provides three independent programmable timer/counters, one of which may be used by the RS-232-C interface 95 as the data transfer clock.

The RS-232 communications port 95 working with the PTM 62 or an externally generated baud rate clock input, interfaces this module with the outside world. Communications port 95 consists of a asychronous communications interface adapter (ACIA) and the associated RS-232-C level converters.

The primary function of the DMA controller 60 is to perform the direct transfer of data between the high speed communications port 96 and memory. This controller consists of a number of individually programmable channels through multiple internal registers.

The high-speed communications port 96 consisting of the communications status register, communications control register, and high-speed protocol controller, provides the module with a high-speed multiprotocol synchronous serial communications port. The high-speed protocol controller can be programmed for HDLC, SDLC, DDCMP and bisync protocols and can transfer data speed of up to 2 MHz half-duplex or 1 MHz full-duplex. Working with an external communications controller board such as a Communications Interface Logic Module, as will be explained in detail hereafter, the communications control register 103 provides three lines to control the operation of this module and the communications status register 107 monitors three-lines to determine the status of this module. In addition the CIL converts the high-speed protocol controller's TTL level input and output signals to the levels required by the communications medium.

The priority interrupt circuit 98 consisting of an octal buffer and an OR gate provides the module 16 with a form of hardware/software priority interrupt capability. This circuit receives a number of interrupt inputs, depending upon the onboard jumper configuration. On receiving an interrupt input, the priority interrupt circuit 98 transfers an IRQ (Interrupt ReQuest) to the onboard microprocessor 52. The interrupt routine now reads the interrupt word from the priority interrupt circuit and decodes it. The decoding sequence of the bits in the interrupt determines the priority of each of the circuit's interrupt inputs.

NCM 16 can be configured to work as a timing master or as a timing slave. In the timing master applications, the sync timing circuit 101 is disabled and not used. In the timing slave applications, however, the timing sync circuit 101 is enabled and used to synchronize the onboard timing with the timing master module in the system so that the respective microprocessors operate 180 degrees out of phase with each other.

The public address bus buffer 99 is continually enabled to couple an address from the system bus to the private address bus.

The public control bus 100 is continually enabled to couple commands from the system bus 85 to the private command bus 56B.

The public data bus buffer 102 is used to transfer data between the selected memory location on the public data bus 54C and the system bus 85. The public bus control logic 80 controls of the operation of this bus buffer 102.

The public bus address decoder 78, consisting of two address decoding PROM's and decoding logic, decodes its address inputs and determines when a system microprocessor is accessing a device on the public bus. When a memory location on the public bus is being accessed, this circuit couples enabling commands to the selected device, and to the public bus control logic.

The public bus control logic 80 upon being enabled by the public bus address decoder 78, processes and decodes its input commands and controls the direction of data flow through the public data bus buffer 102.

The lock bit register 104 provides the programmer with a read-set/write clear register for use as software flags, etc. Each bit in register 104 is individually addressable.

NCM 16 operates either on its onboard crystal clock 58 or an external clock input via the system bus 85. In either case, the module couples this clock signal to the onboard microprocessor which, in turn, generates the QB (Quadrature onBoard) clock and EB (Enable onBoard) clock. These two single clock signals are used to synchronize and control the single microprocessor system's operation. See FIG. 3.

The NCM in a subhost configuration with another NCM module can be configured as a timing master or as a timing slave. As a timing master, the module operates in either its onboard crystal clock, or on an external clock input via the system bus. The timing slave module, on the other hand, receives its clock from the master timing module, either a PCU or network control module. The master timing module, designated board A in FIG. 4B, couples its QB and EB timing signals to the slave timing module as QE (Quadrature External) and EE (Enable External) timing signals. At the same time, the slave timing module generates its own QB and EB timing signals 180° out-of-phase with the master timing module's QE and EE timing signals. The slave timing module now uses the QE and EE clock signals to generate the E-DLY (Extenal DeLaY) signal and uses the QB and EB signals to generate the B-DLY (Board DeLaY) signal. The module now ORs the E-DLY and B-DLY signals together generating the system's $\phi 2$ timing signal. The slave timing module also AND's the QE, EE, and E-DLY together and AND's the QB, EB and B-DLY signals together. The slave timing module now ORs the results of these two AND functions together generating the system WS (Write Strobe) timing signal.

The NCM module in a DMA/data transmit operation, couples data from the selected memory location to the multiple protocol communications controller.

After the DMA controller 60 has sent the last character in the message from memory, it performs one more DMA operation. During this operation the DMA controller generates a DMA-I (DMA Interrupt) command indicating that it is the last character in the message.

The NCM module in a DMA/data receive operation, couples data from the multiple protocol communications controller to the selected memory locations.

PCU Data Acquisition and Control Module

Figure 5A:
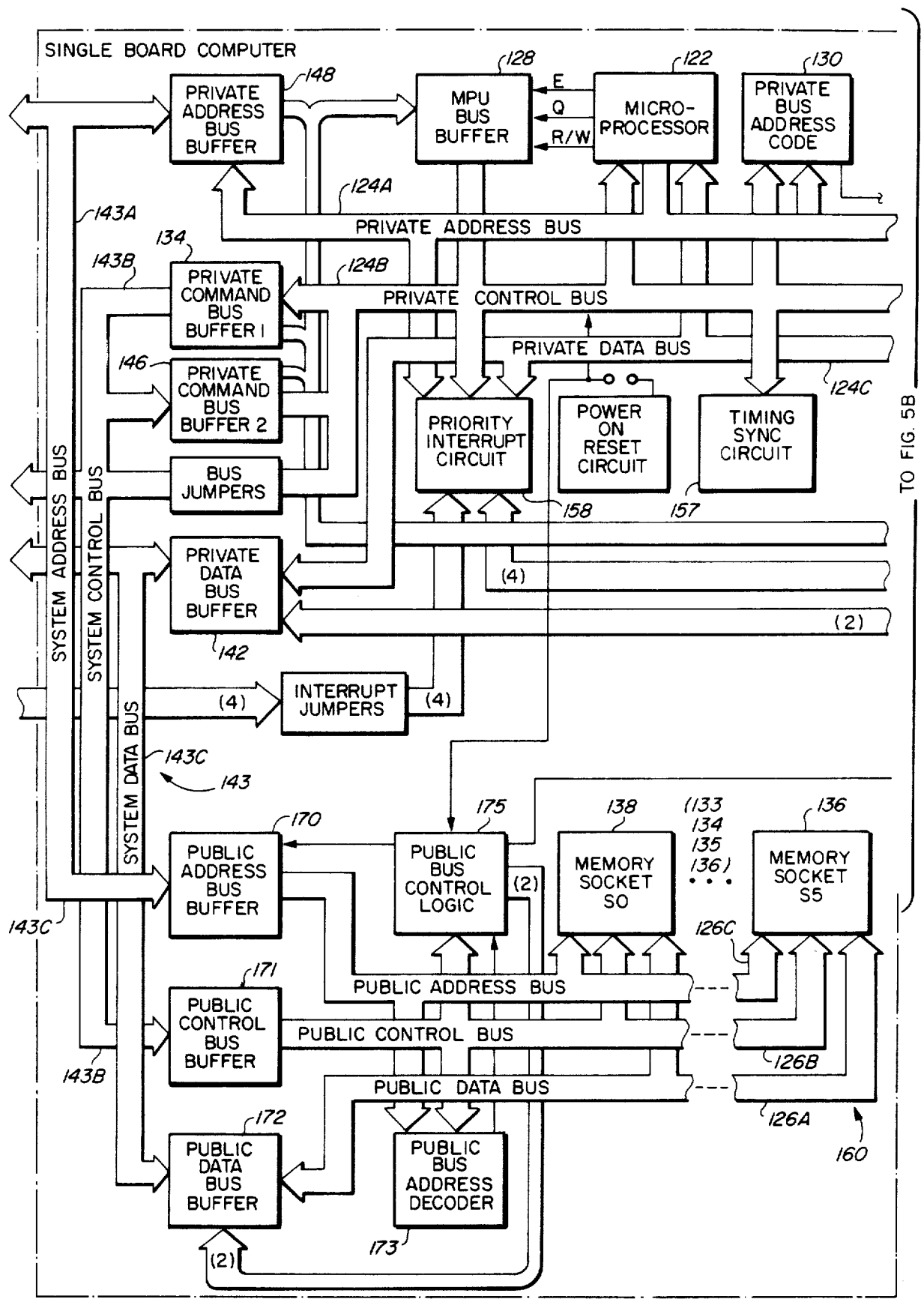
FIG. 5 is a block diagram of the process control module.

Other component modules include the process control unit (PCU) 24 which controls the interface and the internal operations for the system to monitor and control. PCU 24 is a general purpose single board microcomputer which contains a microprocessor 172, synchronous communications interface adaptor 151, memory devices 133 to 140, peripheral interface adaptor 150, counter timer 125, vectored interrupt logic 158 and a real time calendar/clock 154. The PCU is used simultaneously with an NCM 16 to form the foreground/background sections of the system. Referring to FIG. 5 of the drawings, the data acquisition and control module is generally designated by the numeral 24.

PCU 24 is built around a microprocessor 122 such as a 6809 microprocessor as has been described. The PCU module has two onboard buses, the private bus 124 and the public bus 126. The private bus 124 is the private property on the onboard microprocessor 122 and all activity on this bus is controlled by this device.

The public bus 126 on the other hand, is time-shared with all the microprocessors on the system bus. That is, in a multiple microprocessor system, each processor on the system bus can access any memory on the public bus. This time-shared memory addressing concept, in addition to allowing all the system microprocessors access to common memory and I/O, permits the system microprocessors to communicate with each other and to share common resources.

The user determines whether the onboard microprocessor will use the onboard crystal clock 125 output or an external input to generate the system timing signals.

In stand alone and multiple microprocessor applications, the PCU serves as the timing master. In stand alone applications, the module places its E (Enable) and Q (Quadrature) timing signals on the bus as shown in FIG. 4. In multiple microprocessor configurations, the PCU couples its timing signals through connector P2 and the timing jumpers to the other microprocessor modules on the bus for timing synchronization. Timing, using the microprocessor's internal clock circuit, is as has been described with reference to the NCM above.

The microprocessor 122, in accessing memory, places an address on the private address bus 142C, a R/W (Read/Write) command and VUA/VMA (Valid User's Address/Valid Memory Address) command through the MPU bus buffer 128 onto the private control bus 124B and, in a memory write operation, eight bits of data on the data bus 124A. The private address bus 124C transfers the address to the private bus address decoder 130 and to the private address bus buffer 148 while the private control bus 124B couples its control signals to the private bus control logic 132 and private command bus buffer 134. These bus buffers place their respective inputs onto the system bus 143. The public address bus buffer 136 and public control bus buffer 138, in turn, couple the address and commands on their respective system bus inputs to the public bus control logic 140 and public bus address decoder 142.

The private bus address decoder 130 now processes its input and determines whether the onboard microprocessor 122 is accessing a memory location on the private bus 124 or a memory location external to this bus. When this decoder determines that the microprocessor has selected a device on the private bus 124, it applies a select command to that device and an enable command to the private bus control logic 132. The control logic now decodes its input commands and enables the transfer of data between the microprocessor 122 and a selected memory location 139 or 140. The control logic at this time also disables the private data bus buffer 142.

When the onboard processor 122 is accessing memory external to the private bus, the private bus address decoder 130 informs the private bus address decoder which, in turn, decodes the R/W command. Depending on the state of the R/W command, the private bus control logic 132 enables the private data bus buffer 142 to transfer data between the system bus 143A and the microprocessor 122.

The public bus address decoder 173, on determining that a system microprocessor is accessing its memory, couples a select command to the selected memory device and an enabling command to the public bus control logic 175. The control logic now decodes the R/W command and enables the public data bus buffer 172 to transfer data between the selected memory location and the system bus 143A.

For an external unit to gain access to the private bus 124, as during maintenance, the external unit must apply a HALT command to this module. This command halts the microprocessor 122, which in turn places a high level BA (Bus Available) command on the private command bus 124B. The private bus control logic 132 on decoding the BA and HALT commands, disables private command bus buffer 134 and enables private command bus buffer 146 and the private address bus buffer 148 to couple the address and commands from the system bus to their respective private buses. The address bus buffer 148 now enables the private bus address decoder 130 and initiates the transfer of data in the same manner as when the onboard microprocessor accesses this bus except now the private data bus buffer is enabled to transfer data between the selected private bus memory location and the system bus.

When the private address bus buffer 148 receives a high level HBA (Halt and Bus Available) command, it transfers the microprocessor address outputs onto the system bus 143. On receiving a low level HBA command (the onboard microprocessor is halted); it transfers addresses from the system bus onto the private address bus.

Private command bus buffer 134, controls the transfer of commands from the private bus 124 to the system bus 143. On receiving a low-level AOUT command, this buffer circuit is enabled and transfers commands from the private bus 124 to the system bus 143. When this circuit receives a high-level AOUT, this buffer is disabled and places its outputs in their high impedance states.

Private command bus buffer 146 controls the transfer of commands from the system bus 143 to the private bus 124 while the onboard microprocessor is halted. When the onboard microprocessor is operating, buffer 146 receives a high-level HBA input and places its outputs in their high impedance states. When the microprocessor is halted, this buffer receives a low-level HBA input and transfers commands from the system bus to the private bus.

The private data bus buffer 142 is used to transfer data between the onboard microprocessor 122 and the system bus 143. The private bus control logic 132, through its decoding of the private bus address decoder 130 ENABLE and R/W commands controls the operation of bus buffer 142.

The MPU bus buffer 128 receives a low-level HBA command during normal onboard microprocessor applications and couples this device's timing and control signals onto the private command bus 124B. When the onboard microprocessor is halted, buffer 128 receives a high-level HBA command and places its outputs in their high impedance state. This allows an external device to access the private bus.

The private bus address decoder 130, consisting of an address decoding PROM and control logic, decodes its inputs and determines whether microprocessor 122 is accessing a device on the private bus or external to this bus and then generates the appropriate enabling pulses.

The private bus control logic circuit 132, through the decoding of its input commands, controls the flow of addresses, data, and control commands between the private bus and the system bus.

The memory sockets on the private bus can mount various selected memory devices 139, 140.

The peripheral interface adapter (PIA) 150 provides module 24 with two parallel I/O ports. Each port has independently programmable parallel I/O lines, one programmable interrupt line, and a line which can be programmed to function as an interrupt or as a control output line.

The RS-232 communications port 151, working with the baud rate generator, the programmable timer (PTM) 153 or an externally generated baud rate clock input 176, interfaces this module with the outside world. The communications port 151 consists of an asynchronous communications adapter (ACIA) and associated level converters. This interface can be configured to appear as a terminal or as a modem to the external world.

The real time clock circuit provides the module with a real time clock/calendar 154 with a crystal oscillator and tuning capacitors. The crystal oscillator generates the real-time clock circuit's base timing signal and the capacitors fine tune the oscillator. The real time clock/calendar device incorporates addressable real time counters and latches for tinme increments. This circuit is under software control with the applicable program setting as the device and enabling/disabling its interrupt capability.

The real time delay circuit 155 provides the time delay required to interface the real time clock/calendar 154 device with the onboard microprocessor. This time delay in accessing the real time clock allows for the difference in operating speeds between the microprocessor 122 and the real time clock circuit 154.

The priority interrupt circuit 158, consisting of an octal buffer and an OR gate, provides the module 24 with a form of hardware/software priority interrupt capability. This circuit receives a selected number of interrupt inputs, that may be from external inputs or interrupt inputs which are onboard. On receiving an interrupt input, the priority interrupt circuit 158 transfers an IRQ (Interrupt ReQuest) to the microprocessor 122. The interrupt routine now reads the interrupt word from the priority interrupt circuit 158 and decodes it. The decoding sequence of the bits in the interrupt word determines the priority of each of the circuit's interrupt inputs.

In most applications, the PCU module is configured as the system timing master, however, in certain applications this module can be configured to work as a timing slave. In these timing slave applications, the timing sync circuit 157 is used to synchronize the onboard timing with the timing master module so that the respective microprocessors operate 180 degrees out of phase with each other.

The public address bus buffer 136 is continually enabled to couple an address from the system bus 143 to the private address bus 124C.

The public control bus buffer 138 is continually enabled to couple commands from the system bus 143 to the private command bus 124B.

The public data bus buffer 142 operates to transfer data between the selected memory locations 133 to 138 on the public bus 126 and the system bus 143. The public bus control logic 140, through its decoding of the public bus address decoder's PUBEN (Public Bus ENable) and the system R/W command, controls the operation of this bus buffer.

The public bus address decoder 175, consisting of two address decoding PROM's and decoding logic, decodes its address inputs and determines when a system microprocessor is accessing a device on the public bus. When a device on the public bus is being accessed, this circuit couples enabling commands to the selected socket and to the public bus control logic.

The public bus control logic 175 on being enabled by the public bus address decoder 173, processes and decodes its input commands and controls the data direction flow through the public data bus buffer 172.

The six memory sockets 133 to 138 on the public bus 126 can be used to mount up to 12K bytes of RAM, up to 48K bytes of EPROM, or some "mix and match" of RAM and EPROM.

The PCU in a single microprocessor application operates either on its onboard crystal clock 125 or an external clock input via the system bus. In either case, the module couples signal to the onboard microprocessor which, in turn, generates the QB (Quadrature Onboard) clock and the EB (Enable Onboard) clock.

These two signals are used to synchronize and control the single microprocessor system's timing. See FIG. 4.

The module 24 in multiple microprocessor applications can be configured as a timing master or as a timing slave. As a timing master, the module operates on either its onboard crystal clock 25 or on an external clock input via the system bus. The timing slave module, on the other hand, receives its clock from the NCM master timing module. The PCU couples its QB and EB timing signals to the NCM module as QE (Quadrature External) and EE (Enable External) timing signals. At the same time the NCM generates its own QB and EB signals 180° out of phase with the master timing modules QE and EE signals.

It should be noted that in a multiple microprocessor application consisting of two network control modules 16 or a single network control module and a process control unit 24, either of these modules can access the shared memory via the system bus.

AIM Board

The analog input module (AIM) 20 is a general purpose intelligent analog and digital system and is available as another system component which may be incorporated at the subhost and node stations. The AIM provides multiple channels of single ended multiplexed inputs and differential inputs. This module is designed to accept various sensors such as thermocouples, RTD's, strain guages, pressure transducers all on the same module.

The module 20 with its onboard microprocessor 202 is an intelligent analog-to-digital converter that can be used in stand alone and in multiple microprocessor system applications. The AIM module can be furnished in a non-intelligent version without the onboard microprocessor 202. In the latter case, the operation of the non-intelligent version is controlled through the bus interface capability.

The module is built around the programmable gain instrumentation amplifier 204 and a binary analog-to-digital converter 206. The amplifier provides programmable gains and the converter is a dual slope integrating, 12-bit binary plus polarity and overrange, byte oranized analog-to-digital converter with auto zero capability.

The termination panels 210 with their eight input channels, expand the input capability. These panels provide overvoltage protection, undervoltage protection, current guard drive circuitry for sensor input noise rejection, built in microfuse protection, first order filtering, flat response roll-off through user selectable resistors and capacitors, cold reference junction element, and precision source. These capabilities enable the panels to interface with various types of thermocouples, strain guages, RTD's, and time varying high-level/low-level voltage and current inputs. In addition, each channel on the panel has a channel selection status LED.

The series modules use the 6809 microprocessor. Through its unique timing characteristics, as described previously, two microprocessors can share a common memory by operating 180 degrees out of phase with each other. With its 16-bit programmer counter, the address I/O as memory.

The modules derive their clock for the onboard microprocessor and internal timing operations from the jumper selectable onboard 4 MHz crystal clock 212 or from the master timing module in a multiple microprocessor system.

The modules have two memory sockets 214 and 216 on their private bus 225 and shared RAM memory 218.

The RAM memory is time shared between the on-board microprocessor and a microprocessor on the system bus. These two microprocessors operate 180 degrees out-of-phase with each other. Also this shared memory has two unique base memory addresses—one assigned by the address decoding PROM on the module's private bus and the other by the address decoding PROM on the module's system bus.

The RS-232-C communications port 220 is built around the ACIA 222. The onboard peripheral block, consisting of the analog circuitry and the ACIA and, as a group, a single assigned base memory address. Each of the two sockets is individually addressable and has a unique base memory address. In addition, the shared RAM memory has two unique base memory addresses, one on the microprocessor's private bus and the other on the system bus.

Acquisition of analog voltages is accomplished under microprocessor control. The peripheral interface adapter (PIA) 230, acting as an input/output register under control of data bus 254A initiates the sequence. The selected channel input is multiplexed by 23 and fed to the programmable gain control amplifier 204. The gain will have been set by the program through gain control lines from information stored in the PIA 230. When the program is ready to input the analog voltage, enable pulses from amplifier 204 allow the analog voltage to be applied to the A to D converter 266. The output of converter 266 is applied to the data bus 225A as a conversion of the analog input. This resulting digitally coded signal is suitable for processing by the program.

Depending on the functional configuration of the system, the coded voltage may be clocked out via the RS-232-C interface 220 and ACIA 220 or it may be clocked out in parallel format via the data transceiver 235.

In the non-intelligent controlled mode of operation, the module performs the same functions but under control of the system bus command. In this mode the onboard microprocessor can be deactivated.

The module 20, like other modules described above is built around the dual bus concept. The module has two onboard buses, the private bus 225 and public bus 238. The private bus is the private property of the onboard microprocessor.

In the stand-alone mode of operation, the onboard clock 240 is the board clock source. If the onboard microprocessor is removed, all timing is external.

Digital I/O Module

Figure 7:
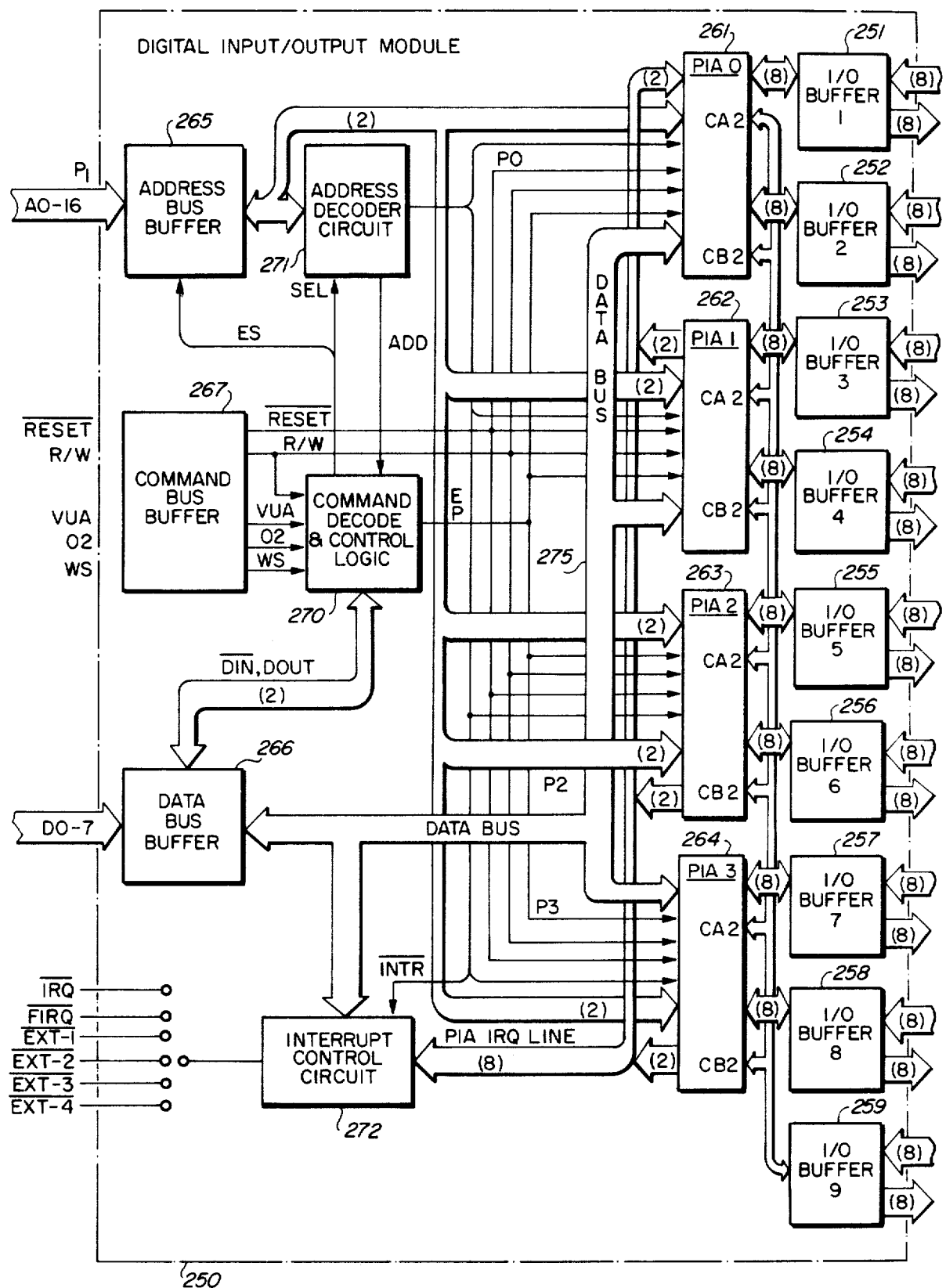
FIG. 7 is a block diagram of the digital module.

The digital module (DM) 22 as shown in FIG. 7 will handle a mixture of multiple digital input and output lines. Each of the lines is software selectable as either an input or an output. The DM board is a general purpose digital input/output interface designed to drive solid state relays, mechanical relays, TTL logic levels and sense logic levels, limit switches or contact closures. The DM board is a single board digital input and output system containing peripheral interface adaptors, buffers and drivers, buffers and receivers and protection circuitry in vectored interrupt. More particularly, referring to FIG. 7.

The digital I/O module 22 provides a microprocessor system with nine 8-bit parallel programmable input/output ports 251 to 259 via four PIAs 261 to 264 and buffer/driver interface circuitry. Input/output ports 251 to 259 can be connected directly to the selected peripheral(s) or can be connected to digital termination panels. The input lines of each port are TTL compatible and buffered before they are applied to the PIAs while the output lines from the PIAs are buffered and coupled through open collector drivers to the outside world. The four PIA 261-264 and nine I/O buffers 251-259 provide nine I/O ports.

Each time a system microprocessor addresses memory, the address bus buffer 265 receives the input (A0 to A15) along with a timing signal, the VUA (Valid User's Address) command, the R/W (Read/Write) command, and in microprocessor systems, a WS (Write Strobe) timing signal. During a memory write operation, the DM 22 also receives the data bus inputs at buffer 267. The module applies the 16 address bus inputs to the address bus buffer 265, the input commands to the command bus buffer 267, and, in a memory write operation, the data bus input to the data bus buffer 266.

On receiving the command inputs during a microprocessor memory access, the command bus buffer 267 applies these inputs to the command decode and control logic 270. This circuit processes its inputs and applies an ES (Enable Strobe) command to the address bus buffer 265. This command enables the address bus buffer 265 to process its input.

The address bus buffer, after buffering its inputs, couples the address bits A0 and A1 to the PIAs 261 to 264 and couples address bits A2 through A15 to the address decoder circuit 271. The address decoder, consisting of an address decoding PROM, a decoder circuit, two inverters decodes address bits A7 through A15 and, on determining that the microprocessor has selected this board, generates an ADD (ADDress) command. This command enables the command decode and control logic to decode the R/W , VUA, 02 and WS inputs. On determining that the address on the bus is valid via the VUA input command, the command decode and control logic generates a SEL (SELect) command. On receiving the SEL command, the address decoder 271 decodes address bits A2 through A6 and selects the onboard circuit to be accessed.

The command decode and control logic 270 in processing and decoding the R/W command, determines whether the microprocessor is performing a memory read or memory write operation. During a memory read operation, this circuit places a high level R/W command on the board's bus and couples a DOUT (DataOUT) command to the data bus buffer 266. The selected memory location in one of the PIA 261 to 264 or in the interrupt control circuit 272 now couples its contents through the data bus interface 275 to the system microprocessor.

In a memory write operation, the command decoder and control logic 270 places a low level R/W command on the command bus and couples a DIN (Data IN) command to the data bus interface. The module now couples data from the microprocessor through the data bus interface to the selected PIA memory location.

When a PIA 261 to 264 initiates an interrupt, the PIA couples an IRQ (Interrupt ReQuest) command to the interrupt control circuit 272 from either its A or B channel. The interrupt control places the IRQ input into the appropriate location in its interrupt register. The interrupt control also couples via the jumper selected interrupt line an interrupt command to the system microprocessor.

Module 22 interfaces physically into motherboard of the chassis 28 through the appropriate address, clock and control bus connectors. Externally, the module interfaces through connectors with locking mechanisms.

CIL

The communications interface logic (CIL) module 18 is a single card interface between the communications network and the network control module. When used with the network control module 16, a network may contain a substantial number of nodes forming a distributing processing system. The network may be subhost controlled or may use a floating master system. The communications networks consists of two redundant channels usually fiber optics in a self-healing ring as has been described above, backed up by RS 422 cable. The CIL communications interface logic module gives high speed communications to the NCM. The CIL derives its clock from an on-board 16 MHz crystal oscillator which synchronizes the received and transmitted data. Buffered outputs of as for example 61.75 KHz to to 8 MHz provides the jumper selectable baud rate control.

Figure 8:
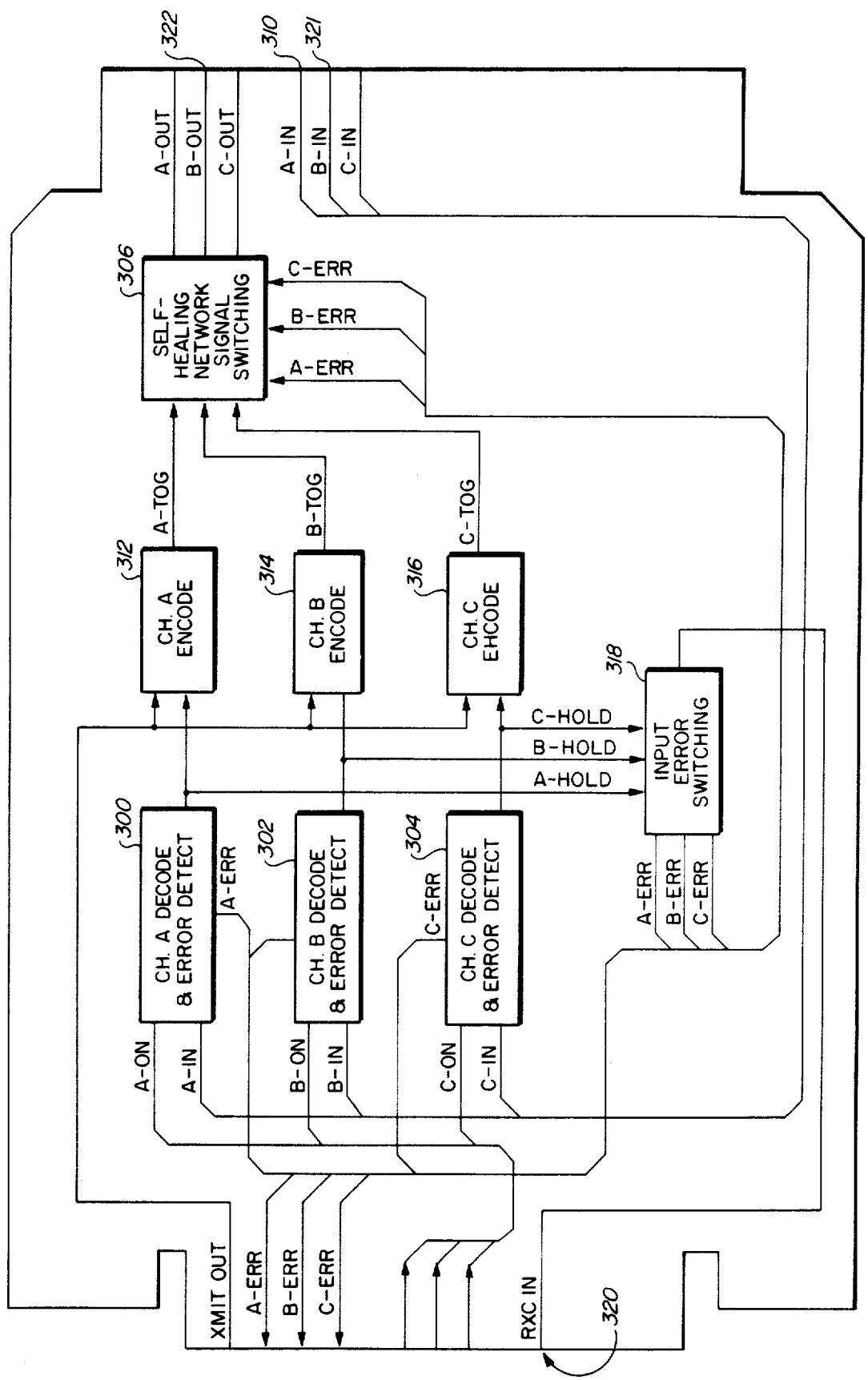
FIG. 8 is a block diagram of the communications interface logic.

CIL 18 is divided into four major blocks as seen in FIG. 8. The module includes channel A decode/error detection 300, channel B decode/error detection 302, channel C decode/error detection 304 and signal control circuitry 306.

Data incoming at 310 is coded. Counter circuits 312, 314, 316 detect and synchronize to the input transmission. An error at input error switching 318 may be generated in two ways. The first is if the fiber optics cable breaks. The second is that the transmitter channel has timed-out with no data. Data is clocked to the NCM at 320.

The channel B circuitry for fiber optic signal and its function is the same as has been described above. Data incoming at 321 is echoed to output 322, error checking is performed, and data from the NCM is transmitted on 322.

The circuitry for channel C is similar except that no check is made for a broken fiber optics cable since channel C drives RS-422 cable.

When the CIL is used with a subhost rather than at a repeater node, all inputs are decoded and available to the subhost but are not encoded and repeated. The CIL, in this case, is also jumpered to transmit from the subhost NCM at all times.

Graphics Module

Figure 9:
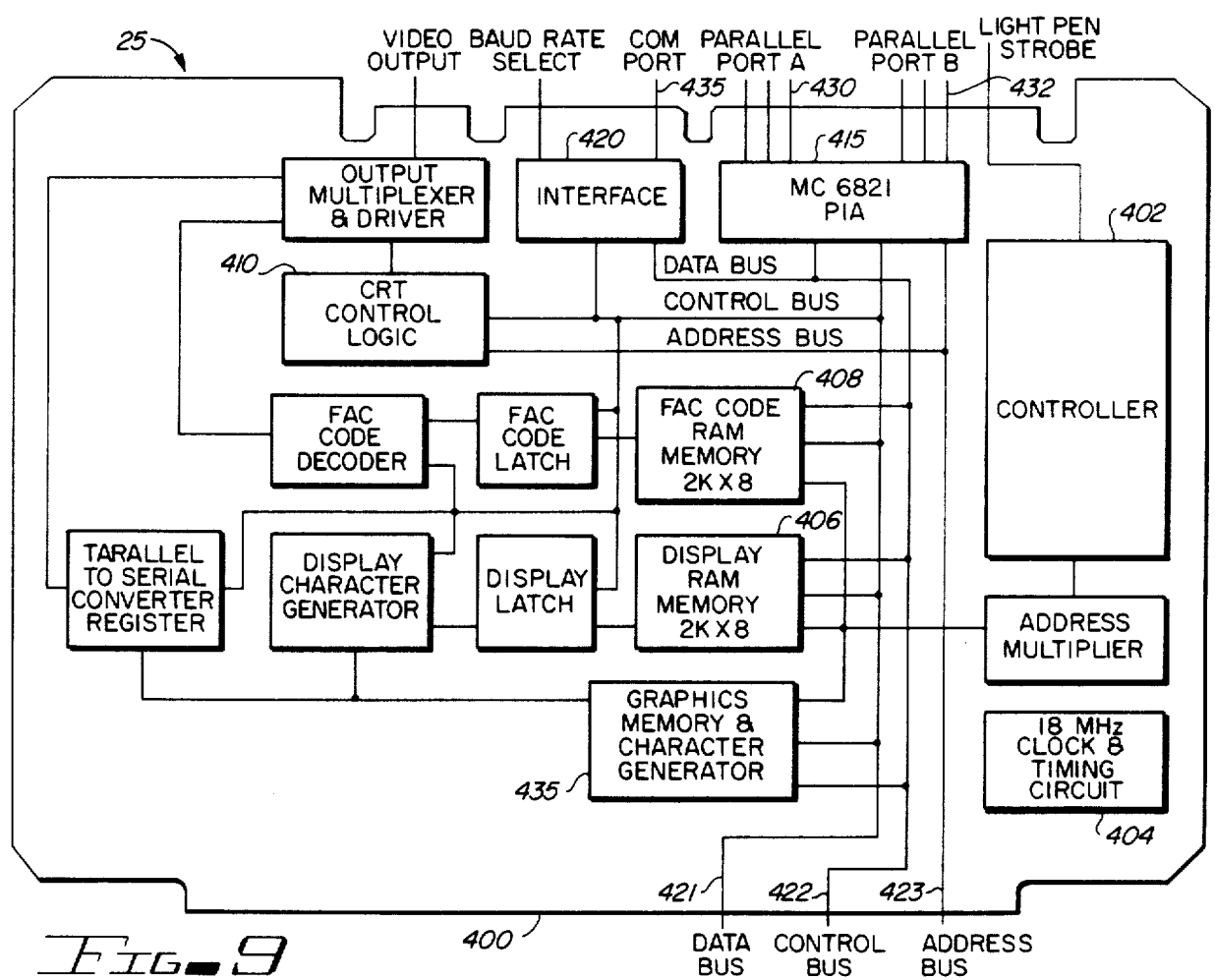
FIG. 9 is a block diagram of the CRT substation module.

Other components, modular in construction, can be configured compatible with the system nodes. The graphics module 25 brings alphanumeric and character graphics display capability to the system and is shown in FIG. 9. The graphic control module 25 working with the PCU controls the keyboard and CRT monitoring functions. A programmable controller sets the horizontal or vertical sync rates, the number of characters per line, the number of lines, the cursor position, the operation of an optional pen light.

The MCG 25 is built around the CRT controller 402, and generates the timing for the module and the external clock for the controlling processor from a crystal oscillator 404. Onboard memory 406, 408 is time-multiplexed between the CRT controller 410 for screen refresh, and the controlling system microprocessor display updating.

In addition, a PIA 415 provides multiple individually programmable I/O lines, which may be configured as two 8-bit parallel I/O ports, for use with a keyboard, keypad, or printer. The MCG 25 is built around CRT controller 402 and are bus compatible with the system buses at data bus 421, control bus 422, and address bus 423. In addition to CRT controller 402, the module includes display memory 406, FAC (Field Attribute Character) code refresh memory 408, a crystal controlled clock and timing circuit 404, parallel I/O ports 430, 432 for keyboard interface and a conventional signal compatible port 435 such as RS-232-C.

The MCG working with a PCU controls the keyboard and CRT monitor functions. Controller 402 is programmable to set the horizontal and vertical sync rates, number of characters per line, number of lines, cursor position and to control the operation of a pen light. The user's system software sets up the ACIA and PIA 415 as well as loading the selected graphic characters in the graphic character memory generator 435.

Still other subsystems and modules may be incorporated into the system of the present invention. An analog termination panel through a multiplexer may interface the analog input module with 8 differential or 16 single ended inputs. These inputs may be from RTD's, thermocouples, strain guages, and the like. In processing each input, the analog termination panel provides overvoltage protection, first order filtering, scaling through input resistance selection, current guarding for each channel, and low Ron input impedence. This subsystem also can provide the RTD 2.048.RTD reference voltage and the cold junction temperature reference.

A digital termination panel through its mounting of a plurality of opto-relays interfaces the digital I/O modules with high level AC and DC inputs. The user installs the appropriate plug-in opto-relays to meet the application requirements. The load side of each independent I/O line has a visible clip-in fuse, a push-to-activate switch and a saturable reactor. The fuse provides overcurrent protection. The switch enables manual testing of the line, the switch LED indicates when the line is enable and the saturable reactor with its LED indicate when current is flowing in the load time.

Thus it will be seen that the present invention provides a distributed plant automation computer which is simple and effective and uses a unique building-block or modular concept. Simply by adding modules to any node can be adapted to perform various functions, including the following; (1) monitoring processes with digital or analog data acquisition; (2) monitoring operation of process controllers; (3) display process parameters; (4) have a common data base within another node; and (5) provide controller-to-controller communication in real time. The system is microcomputer based monitor and communication system and management of information is transmitted over a redundant high-speed fiber optics system which is immune to outside interference from electrical and environmental sources and has fold-back capability. The network is a gateway system for passing data between the host and network loop or between the network loops. The system is expandable by including additional nodes or loops.

It will be obvious to those skilled in the art to make various changes, alterations, and modifications to the automated monitoring and communication system of the present invention. To the extent those changes, alterations and modifications do not depart from the spirit and scope of the appended claims, they are intended to be encompassed therein.

We claim:

1. A fault tolerant distributed network process control and communications network system for controlling and/or monitoring a plurality of work stations comprising:
   (a) a plurality of nodes for selected work stations each adapted to monitor or control individual work stations inter-connected by communications network means, each node including:
      (i) processor means dedicated to network communication and process I/O;
      (ii) network control means for controlling inter-node protocol communications and further including clocking means and error detection and correction means;
      (iii) communications interface logic means for interfacing between the communications network and the network control means and further including clocking means and error correction and detection means for reshaping and resynchronizing the transmitted signal at each communication interface logic means;
   (b) said communications network means interconnecting said network node and said plurality of nodes; said network communication means having two primary channels (A and B) in a first communications media which operate to simultaneously transmit data between the said nodes in opposite directions and a third back-up channel (C) which is normally on standby;
   (c) said communications interface logic means upon failure of channel A or B being operable to switch to the other of channel A or B and channels A and B will fold back on themselves with data also being transmitted on the nonfailed channel A or B, whereby transmitted data will pass through all nodes in the network regardless of message destination;
   (d) said network control means and said communications interface logic means upon failure of channels A and B being operable to switch to channel C; and
   (e) said communications interface logic means including means continually monitoring channels A, B and C whereby upon fault correction, said error detection and correction means prioritize communications to channel A.

2. The system of claim 1 wherein said processor means comprises first and second processors operating independently of one another, network control means, communications interface logic means and said processors are interconnected on a common bus system for receiving and transmitting address, data and control instructions.

3. The system of claim 1 wherein channels A and B are fiber optics channels.

4. The system of claim 2 wherein at least one of said nodes includes PCU data acquisition and control means to off-load the network control means and wherein said first processor is dedicated to network communication and said second processor is dedicated to process I/O.

5. The system of claim 2 wherein one of said nodes includes analog input means for accepting various analog inputs and compatible with the common bus system bus.

6. The system of claim 2 wherein at least one of said nodes includes digital means for processing digital inputs and outputs compatible with the common bus system bus.

7. The system of claim 1 including colorgraphics means for displaying alphanumeric and graphics and compatible with the common system bus.

8. The system of claim 7 wherein said colorgraphics comprises a CRT display under control of said first processor and synchronized to the second processor and further including first memory means providing storage for CRT page alphanumeric information which first memory element resides in the addressing map and public bus system; a second memory means providing storage for graphics data and information having memory elements residing in the public bus system; third memory means for storage of FAC code, color pixel data and information having memory elements residing in the public bus system; clock means for generating predetermined clock pulses for CRT horizontal and vertical signal timing; said clock means synchronizing the said second processor whereby the CRT graphics display is controlled by the second processor independent of network communications with the said first processor.

9. The system of claim 1 wherein one of said nodes comprises a subhost node.

10. The system of claim 2 wherein said clocking means associated with said network control means and said communication interface logic means includes first counting means for counting and dividing clock pulses to a predetermined phase angle for timing said first processor, and second counting means for counting and dividing clock pulses to a predetermined phase angle minus 180° for timing of second of said processors.

11. The system of claim 2 including gating means permitting said first and second processors to operate simultaneously on the public bus system.

12. The system of claim 2 further including a private bus common to the said processors, means for gating and enabling the flow of addressing, data and control signals both to the public bus system as well as to said separate private bus for the said first processor; means for enabling and gating the flow of addressing data and control signals both to the public bus system as well as the separate private bus for the second processor, gating means for preventing the first processor from reading and writing to the private bus components of the second processor; gating means for preventing the second processor from reading and writing to the private bus of the said first processor.

13. The system of claim 12 further including multitasking computer executive means associated with each of the said first and second processors, said executive means comprising memory means for storing the computer program tasks of the first processor in the public bus system address space; memory means for storing program vectors, task identification and tables in the private bus of the first processor; memory means for storing the executive of the second processor in the public bus system address space; memory means for storing program vectors, task identification and tables in the private bus of the second processor.

14. The system of claim 2 including an analog input module means having a third processor adapted to operate simultaneously with the said first and second processors and memory means for permitting interface between the public bus system and the analog input module.

15. The system of claim 14 wherein the analog input module is synchronized to the second processor.

16. The system of claim 3 wherein channel C comprises conventional hardwire twisted pair.

17. A fault tolerant distributed network process control and communications network system for controlling and/or monitoring a plurality of work stations comprising:
   (a) a plurality of nodes for selected work stations each adapted to monitor or control individual work stations inter-connected by a first communications network means, each node including;
      (i) processor means dedicated to network communications and process I/O;
      (ii) network control means for controlling inter-node protocol communications and further including clocking means and error detection and correction means;
      (iii) communications interface logic means for interfacing and including clocking means and error correction and detection means for reshaping and resynchronizing the transmitted signal at each communication interface logic means, and at least one of said nodes including at least two network control means and at least two communication interface logic means serving as a gateway node;
   (b) said first communications network means inter-connecting said network node and said plurality of nodes; said network communication means having two primary channel (A and B) in a first communications media which operate to simultaneously transmit data between the said nodes in opposite directions and a third back-up channel (C) which is normally on standby, said communications interface logic means operable upon failure of A or B to switch to the other of channel A or B, and upon failure of A and B, said network control means and said communications interface logic means operable to switch to channel C and whereby upon failure of A or B, channels A and B will fold back on themselves with data also being transmitted on the nonfailed channel A or B, whereby transmitted data will pass through all nodes in the network regardless of message and destination;
   (c) said communications interface logic means including means continually monitoring channels A, B and C whereby upon fault correction, said error detection and correction means prioritize communications to channel A; and
   (d) second communications network means similar to said first communication network means having a plurality of nodes therein with the said gateway node being comon to the two said communication network means.

18. The system of claim 17 wherein said A and B channels are fiber optic channels.

* * * * *